United States Patent Office 3,193,769
Patented July 6, 1965

3,193,769
SIGNAL FREQUENCY COMPARATOR AND
CONTROL APPARATUS
Richard A. Graham, Mequon, and Frederick W. Gruner,
Milwaukee, Wis., assignors to Jordan Controls, Inc.,
Milwaukee, Wis., a corporation of Wisconsin
Filed Mar. 6, 1961, Ser. No. 93,447
3 Claims. (Cl. 328—133)

This invention relates to a signal frequency comparator and control apparatus and particularly to a comparator providing a rapid and direct comparison of two frequencies and establishing an output signal having a frequency proportional to the frequency difference of the two input signals.

Closed loop control of speed, blending and proportioning of material and the like have been proposed wherein a signal which is proportional to the actual output of the system is compared with a preset signal which is proportional to the desired condition to establish a loop control signal which maintains a desired output condition. Various electrical signal forms, normally of the analogue variety, have in the past been employed to provide the necessary comparison. The amplitude, frequency, or some other characteristic is selected for providing the necessary comparisons.

Analogue control systems employing comparison of continuously varying signals such as voltages, are inherently somewhat less accurate than control systems employing signals consisting of trains of equally time-spaced pulses.

The frequency or pulse repetition rate of each train of pulses in the latter type of control system can be readily controlled in accordance with a desired and presettable condition and the actual output condition. The load can then be actuated in accordance with a comparison of the pulse trains. However, no convenient and rapid means of directly comparing the pulse repetition rate or frequency of the pulse signals is presently available.

The present invention is directed to providing a new and novel comparator for comparing the frequency of pulse signals. The comparator is particularly adapted for providing an improved feedback control for establishing automatic indicating, recording or correcting of error in accordance with the relative frequencies of a condition responsive signal and a preset signal. The condition responsive signal consists of a series of time-spaced pulses of a frequency corresponding to the actual output condition of the system. The preset signal includes a series of time-spaced pulses of a frequency corresponding to a desired output of a system or function. The frequencies of the two signals are compared by the relative position of successive pulses in each of the alternate signals to provide an output in proportion to the frequency difference. The output may be presented to one of two output devices to indicate which of the two frequencies is the higher.

In accordance with the present invention, a pair of signal channels, one for each of the signals, is provided having output gates for transmitting the associated train of signals which may be incorporated in a feedback control. A switching means is actuated by each of the signals. Each pulse in the respective signals actuates the switching means to open the output gate in the corresponding channel to allow transmission of a subsequent pulse in that signal and to close the opposite gate to prevent transmission of a pulse in the opposite signal. If the pulses are successively applied from alternate signals to the switching means, the output gates are always closed and prevent transmission of any output signal. If, however, the frequency of one signal is greater than the frequency of the other, two or more pulses of the higher frequency signal are transmitted in a period of adjacent pulses from the alternate or other channel. Consequently, the higher frequency signal establishes a first pulse opening the corresponding output gate and a second pulse which is transmitted through the output gate before the pulse from the alternate channel is fed to close the first-named gate. This provides an output or error signal indicating the error and adapted for adjusting the operation of the system to compensate for the error.

In accordance with the present invention, the two channels for the signals may be interconnected such that each pulse input to a channel blocks or closes the other channel for a short period of time. This inserts a time delay in the operation of the two channels to prevent transmission of pulses faster than the switching means can be actuated.

Further, in accordance with still another aspect of this invention, the output signals are fed to a pulse rate detector to determine the rate at which the output pulses are being established. The detector establishes a control action whose control magnitude, for each output pulse, varies in proportion to the rate of change of the output pulse frequency. The rate control signal of the rate detector is fed into the feedback loop to adjust the output signal and increase or decrease the rate of correction per pulse, if necessary, to thereby provide stability in the closed loop system.

The drawings furnished herewith illustrate the best mode presently contemplated for carrying out the invention.

In the drawings:

FIG. 3 is a schematic circuit diagram of the rate responsive control shown in block diagram in FIG. 1.

Figure 1:
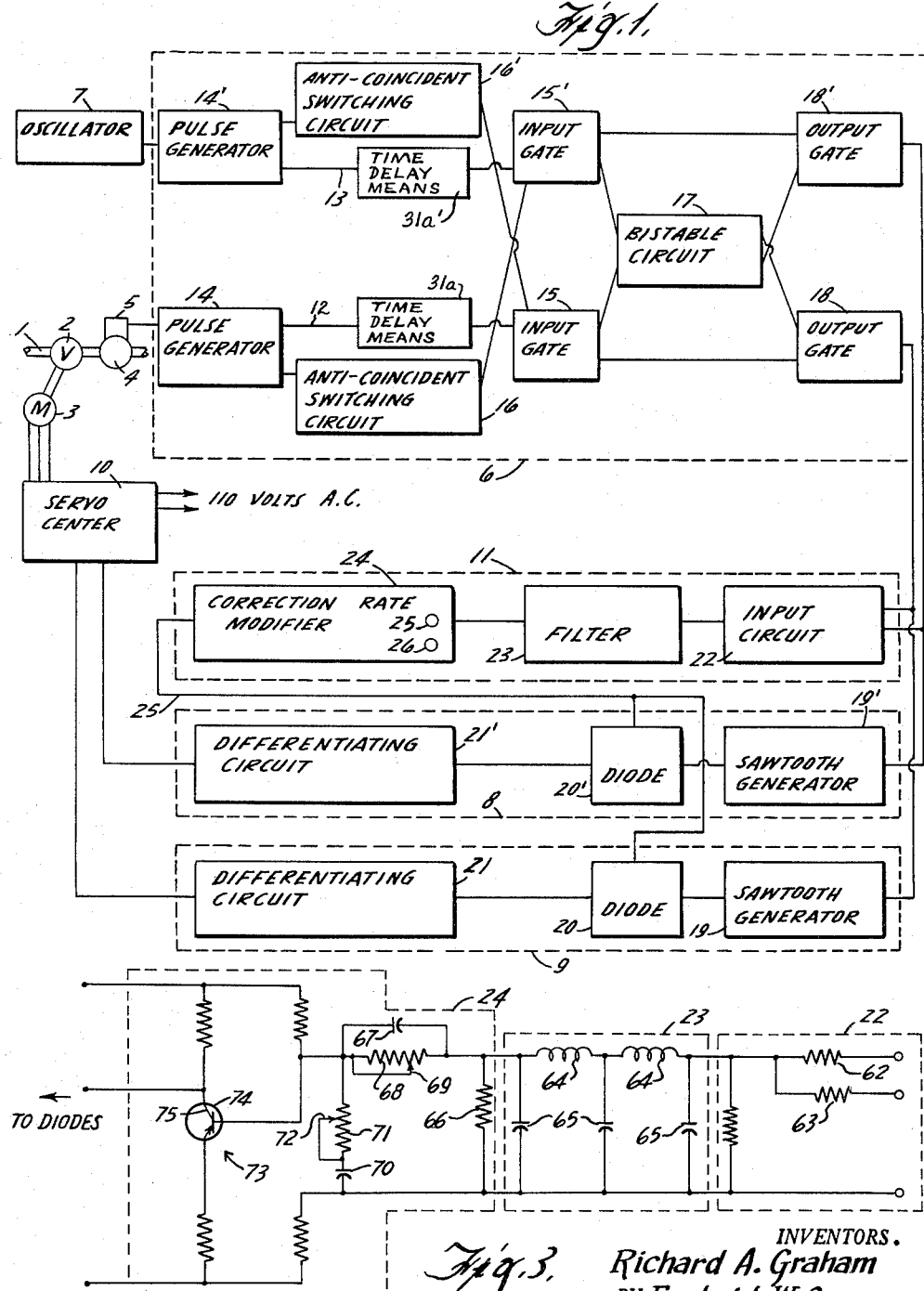
FIG. 1 is a block diagram illustrating the present invention applied to a closed loop servo system.

Referring to the drawings and particularly to FIG. 1, a fluid flow line 1 includes a valve 2 for regulating the fluid flow through the line 1. A reversible motor 3 is coupled to the valve 2 to automatically close and open the valve in response to energization of the motor. A fluid meter 4 is also connected in series in the flow line 1 and drives an associated generator 5 which establishes an alternating current signal constituting a condition responsive signal having a frequency proportional to the fluid flow through the flow line 1 and meter 4. A frequency comparator 6 constructed in accordance with one aspect of this invention has an input connected to the output of the generator 5. An oscillator 7 is connected to a second input to the frequency comparator 6 and establishes a preset signal having a frequency corresponding to the frequency output of generator 5 with fluid flow at the desired rate.

The illustrated frequency comparator 6 is adapted to automatically establish pulse signals corresponding to the frequency difference of signals from generator 5 and oscillator 7. An output from comparator 6 is established in accordance with the higher frequency pulse signal and in direct proportion to the degree by which the frequency of the signals differ.

A pair of control signal generators 8 and 9 are connected to the output of the comparator 6 and connected to the input of a servo control center 10 for energizing of the motor 3. The signal fed back to the servo control center 10 by generators 8 and 9 determines the energization of the motor 3 which, in turn, varies the degree of opening of the valve 2 to maintain the preselected flow through flow line 1.

A pulse rate responsive control 11 is connected to the output of comparator 6 and to a control input to the signal generators 8 and 9. As more fully described hereinafter, the rate responsive control 11 is adapted to further modify the output signals from the generators 8 and 9 in accordance with the rapidity of correction of any error in the flow through line 1, as reflected in the output of the generator 5. If the output of the comparator 6 continues to increase or decrease and indicates that an error is arising in flow line 1 faster than the servo control center 10 is being directed to correct the error, the rate responsive control 11 operates to increase the signal to the control center and thereby increases the rate of response of the servo system.

The frequency comparator 6, shown in FIG. 1, includes a pair of similar signal channels 12 and 13 for the signals from the respective generator 5 and oscillator 7. Because of this similarity, only channel 12, which is connected to the output of generator 5, is specifically described hereinafter; corresponding elements in the opposite channel 13 being correspondingly numbered with a superscript prime (') added for clarity and simplicity of explanation.

Referring particularly to FIG. 1, the generator 5 is connected to the input of a trigger and pulse generator 14 in channel 12. The generator 14 is a suitable device adapted to establish a pulse for each complete cycle in the alternating current signal established by generator 5. The present invention may be employed with any suitable input signals which can be converted into time-spaced pulses.

In the illustrated embodiment, a train of pulses is established of a pulse repetition rate or frequency corresponding to the frequency of the A.C. output signal of generator 5.

An input gate 15 is connected to the output of the pulse generator 14 and is adapted to pass the pulse signals when the gate is open.

An anti-coincident blanking or switching circuit 16 is also connected to the output of the generator 14 and to a control input of the input gate 15 in the opposite channel 13. Circuit 16 of channel 12 controls the opening and closing of the opposite gate 15 in channel 13 for selective transmission of the signal from oscillator 7, as more fully described hereinafter.

Similarly, gate 15 of channel 12 is controlled by an anti-coincident switching circuit 16 in channel 13.

A bistable circuit 17 is connected to the output side of the gates 15 in both channels 12 and 13. Bistable circuit 17 constitutes a switching means having two stable outputs respectively established by pulse signals from the respective gates 15.

An output gate 18 includes a pair of inputs connected one each to the output of the gate 15 and to the output of the bistable circuit 17. The signal from the bistable circuit 17 is adapted to selectively open and close the gate 18. A pulse from gate 15 in channel 12 to the bistable circuit 17 places the latter in a stable state having an output closing gate 18 in channel 13 and opening gate 18 in channel 12.

In the absence of pulses from channel 13, the first pulse in channel 12 enables or opens the output gate 18 via the bistable circuit 17. The second pulse in the channel 12 then passes through the enabled output gate 18 as an error signal to the associated control signal generator 9.

Similarly, if successive pulses from oscillator 7 are transmitted via channel 13 to the bistable circuit 17 before a pulse is transmitted from generator 5 via channel 12, an error signal passes through the output gate 18 in channel 13 to the control signal generator 8.

The generators 8 and 9 are thus energized and establish an output signal which is fed back into the servo control center 10 to control the energization of motor 3.

However, if pulse signals from channels 12 and 13 are alternately applied to the bistable circuit 17, the output gates 18 are held closed and prevent transmission of pulses to generators 8 and 9.

The output signals from output gates 18 are simultaneously applied to the pulse rate responsive control 11 and to the corresponding generators 8 and 9.

Generators 8 and 9 are similarly constructed and each includes a sawtooth generator 19 having an input connected to the output of the associated output gate 18. A diode 20 is connected to the output of the generator 19 to establish a preselected clipping of the sawtooth signal from generator 19. A differentiating circuit 21 is connected to the output of diode 20 and establishes a square wave signal having a width determined by the degree or amount that the diode 20 clips the sawtooth signal. The output of circuit 21 is connected to the servo control center 10 to regulate the opening and closing of valve 2.

The pulse rate responsive control 11 is responsive to the frequency of the output pulses from gates 18 in channels 12 and 13. The output of control 11 is connected into the generators 8 and 9 to further modify the output signals from the respective generators as follows.

The illustrated rate responsive control 11 includes an input circuit 22 having a pair of inputs connected one each to the gates 18 in channels 12 and 13 and establishing an output voltage pulse for each correction pulse received from either gate 18. A filter 23 is connected to the output of the generator 22 to establish a D.C. control voltage signal proportional to the number of pulses established in the output from the input circuit 22. An adjustable correction rate modifier 24 is connected to the output of the filter 23 and to a control input of diodes 20 forming a part of the generators 8 and 9. The output of modifier 24 constitutes a bias on the diodes 20 and determines the degree of clipping of the sawtooth signal applied to diode 20 from the sawtooth generator 19. A pair of individually actuated input controls 25 and 26 of modifier 24 allows manual setting of the time constant and therefore the effective output of the modifier 24 for a given input rate of change and establishes closed loop system stability.

If the correction rate is not sufficient to correct the fluid flow in line 1, the output of correction rate modifier 24 decreases the diode 20 bias.

The decreased bias on diode 20 decreases the clipping of the sawtooth signal from generator 19 to increase the width of signal passed by the differentiating circuit 21. The feedback control signal extends the length of correction for regulating valve 2 to more rapidly correct the flow rate and provide closed loop system stability.

Thus, generators 8 and 9 are adapted to establish a correction pulse of a predetermined width for each pulse received from respective channels 12 and 13. The pulse rate responsive control 11 modifies the width of the correction pulse of the generators 8 and 9 to increase or decrease the rate of control in accordance with a preselected correction rate for establishing stability of the system.

Figure 2:
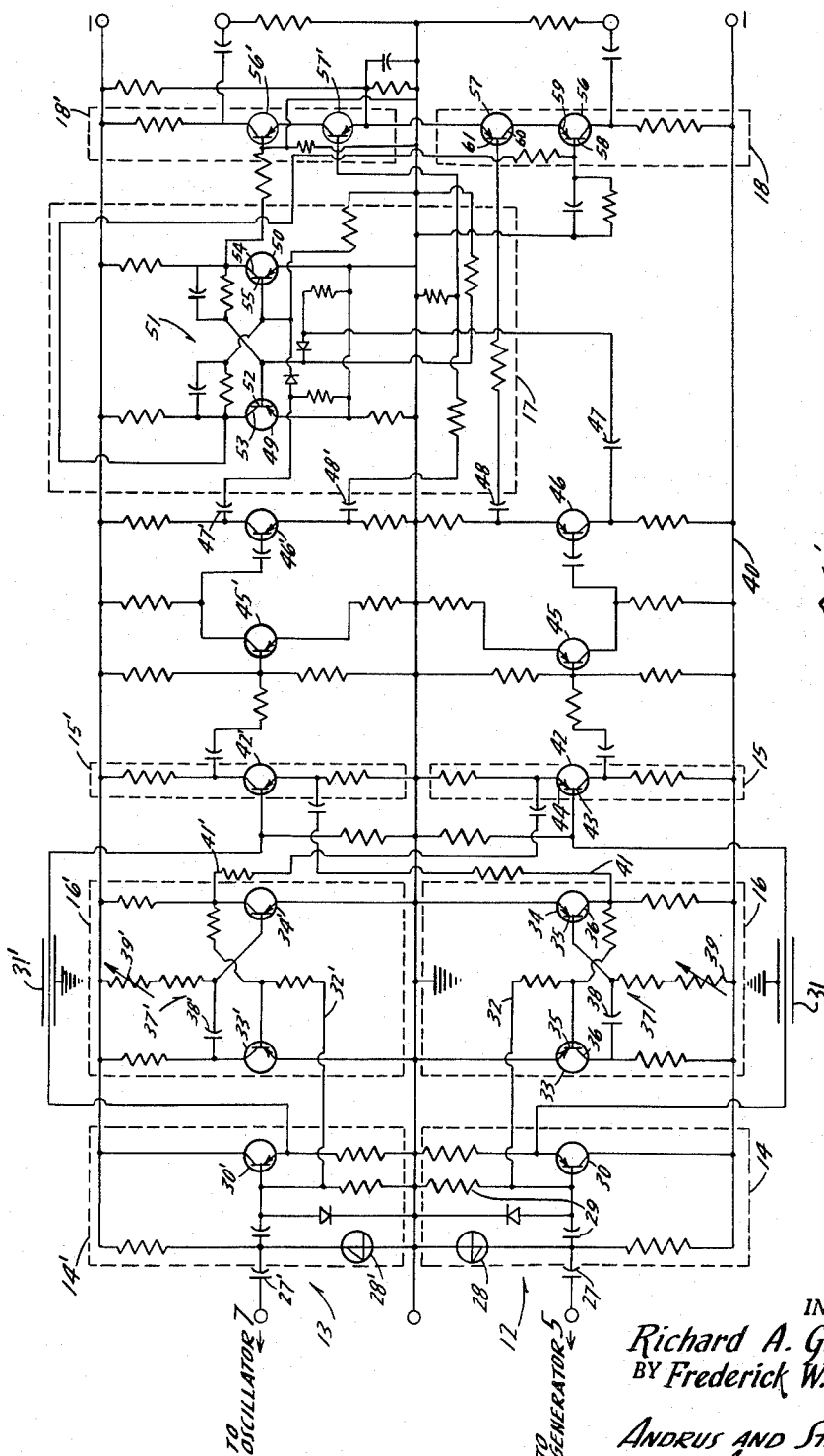
FIG. 2 is a schematic circuit diagram of a frequency comparator constructed in accordance with the present invention and shown in block diagram in FIG. 1.

Referring particularly to FIG. 2, a schematic transistorized circuit diagram of the comparator 6 is illustrated. In FIG. 2, the various elements in channels 12 and 13 corresponding to the block diagram of FIG. 1 are shown in dotted blocks.

The various loading and biasing elements shown in the circuit of FIG. 2 will be readily understood by those skilled in the art and no further description is given except where necessary to maintain clarity and completeness of explanation.

Referring particularly to FIG. 2, a coupling capacitor 27 is connected to the output of the generator 5 and connected to the trigger generator 14 in channel 12. The generator 14 includes a trigger diode 28 and a differentiating circuit 29 which establishes a sharp spike pulse of negative polarity for each complete cycle of the signal from generator 5. Triggering diode 28 establishes a minimum level at which a pulse is formed.

An amplifying transistor 30, which is connected as an emitter follower, amplifies the pulse and transmits the amplified pulse to gate 15 via a coaxial time delay line 31 which is connected to the output of the amplifying transistor 30 and to an input of the gate 15. The time delay line 31 delays the pulse transmission to permit proper operation of the switching circuit 16 and is shown diagrammatically in FIG. 1 by a block 31a labeled time delay means. Gate 15 is normally open except for a short period during a blanking pulse which is fed from the anti-coincident switching circuit 16 in the opposite channel 13 to gate 15 of channel 12. The pulse in channel 12 similarly actuates the circuit 16 of channel 12 to blank gate 15 in channel 13 as follows.

A lead 32 connects the pulse signal established by diode 28 and differentiating circuit 29 directly to the anti-coincident switching circuit 16 in channel 12. The circuit 16 establishes a timed output for each input pulse received which is fed to gate 15 in channel 13.

The anti-coincident circuit 16 is illustrated as a generally known monostable multivibrator circuit formed by a pair of similar common emitter connected transistors 33 and 34. Bases 35 of the transistors 33 and 34 are interconnected with the collectors 36 of the opposite transistor by a bias and regenerative coupling circuit 37. The bias is selected to establish transistor 34 as a normally conducting transistor in the stable or quiescent condition of the multivibrator circuit. Base 35 of transistor 33 is connected by the lead 32 to the output of the differentiating circuit 29 of generator 14. A negative pulse signal from generator 14 therefore drives the base 35 of transistor 33 negative to bias transistor 33 to start conduction and transistor 34 to cut-off. Coupling circuit 37 is regenerative and results in a rapid switching of current from transistor 34 to transistor 33. This represents a semi-stable condition where the multivibrator remains for a predetermined period before returning to the stable condition with transistor 33 again cut-off and transistor 34 conducting.

The coupling circuit 37 includes a capacitor 38 and a potentiometer 39 connected in series between collector 36 of transistor 33 and a negative bias supply line 40. The value of resistance inserted by potentiometer 39 determines the period of the semi-stable condition and therefore determines time period or width of the output signal of the circuit 16. An output line 41 connects the collector 36 of transistor 34 to an input of the gate 15 in the opposite channel 13 to impress the output signal upon gate 15 and thereby hold the gate closed for the period of the semi-stable state of the monostable multivibrator.

Similarly, the circuit 16 of channel 13 holds gate 15 of channel 12 closed for a selected period when a pulse is transmitted via channel 13 from oscillator 7.

The illustrated control gate 15 includes a transistor 42 connected as a common emitter amplifier having an input base 43 connected to the output of the transistor amplifier 30 of pulse generator 14 by the time delay line 31. Transistor 42 includes an emitter 44 which is connected to the anti-coincident switching circuit 16 of the opposite channel by line 41. The output of switching circuit 16 holds emitter 44 at a voltage level which prevents conduction via gate 15 for the period of the semi-stable condition of the circuit 16.

The potentiometer 39 in circuit 16 is adjusted to establish a semi-stable condition which is correlated with the time delay period established by the time delay line 31. Generally, the semi-stable condition is established to exceed the time delay time of line 31 by a factor of approximately 2.

Assume that a pair of in-phase pulses are transmitted via channels 12 and 13. The signals are each transmitted to the corresponding gates 15 after a time delay established by the time delay line 31. The signals are immediately transmitted to the switching circuits 16 and rapidly establish the semi-stable condition of circuits 16. The output signals from circuits 16 are transmitted via lines 41 to close gates 15 in the opposite channels for a preselected period. The pulse signals are transmitted by time delay line 31 to the associated gates 15 generally at the center of the signal from the circuit 16. This insures operation of the circuit 16 before the pulse signal via line 31 reaches gate 15. The time duration of the individual pulses from transistor 30 of generator 14 is very short compared to the width or period of the output signal of circuit 16 and such pulses disappear before gates 15 open. Therefore, in-phase pulse signals in channels 12 and 13 are not transmitted via either gate 15.

If the pulse signals from generator 5 and oscillator 7 are applied to the respective channels 12 and 13 with only a very slight difference in phase, the anti-coincident circuit 16 still prevents transmission of either pulse through the gates 15 of channels 12 and 13. The time which must elapse is equal to the difference between the periods of the time delay line 31 and the circuits 16. When a greater time different is present, the blanking pulse from circuit 16 has no effect on the transmission of pulses. The time difference required between the pulses in channels 12 and 13 is selected to be at least as long as the response or switching time of the bistable circuit 17 which is connected to receive pulses from gates 15 of both channels 12 and 13 as follows.

An inverter amplifying transistor 45 and a driver amplifying transistor 46 are connected in cascade between the output of the gate 15 and the input to the bistable circuit 17 in FIG. 2. The transistor 45 reverses the polarity of the pulse signal from gate 15 for proper actuation of the bistable circuit 17 and the transistor 46 increases the amplitude of the signal to a proper operating level. Coupling capacitors 47 and 48 connect outputs of the driver transistors 46 in the channels 12 and 13 to the bistable circuit 17 and simultaneously to the corresponding output gate 18.

The bistable circuit 17 shown in FIG. 2, is a non-saturating bistable multivibrator of a generally known functioning and construction. The bistable multivibrator of circuit 17 includes a pair of transistors 49 and 50 interconnected by a regenerative coupling circuit 51 to establish and maintain conduction through one or the other of the transistors, depending upon receipt of trigger pulses from channels 12 and 13.

Referring particularly to channel 12, transistor 49 includes a base 52 which is connected by the coupling capacitor 47 to the output of the driver amplifying transistor 46 in channel 12. A pulse from the driver transistor 46 biases transistor 49 to conduct and transistor 50 to non-conduct. The coupling circuit 51 maintains the circuit in the first stable state or condition of the multivibrator. Transistor 49 includes an output collector 53 which is connected to the gate 18 of channel 12. When transistor 49 conducts, a less negative signal is established at the collector 53 which signal opens the gate 18 in channel 12.

Transistor 50 includes a collector 54 which is connected to the gate 18 in the opposite channel 13. When transistor 50 ceases to conduct as a result of the above described signal from channel 12, a more negative signal is established at collector 54 and is applied to and closes gate 18 in channel 13. Thus, when the transistor 49 is conducting and transistor 50 is non-conducting, as a result of the trigger pulse transmitted via channel 12, gate 18 of the channel 13 is closed and gate 18 of channel 12 is opened.

Similarly, the driver amplifying transistor 46 in channel 13 is reversely connected to impress a trigger signal to the base 55 of transistor 50 of the multivibrator and biases transistor 50 to conduct and transistor 49 to cut off. Therefore, upon receipt of a pulse through channel 13, the multivibrator circuit 17 is actuated and gate 18 of channel 13 opens and gate 18 of channel 12 closes.

In a non-saturating multivibrator circuit, the current in the conducting transistor never is at the maximum level. The bistable multivibrator circuit is preferably non-saturating because of the very rapid response and switching action in this type of circuit.

As previously noted, the coupling capacitor 48 also connects the driver amplifying transistors 46 directly to the gates 18 for transmission of successive pulses to the generators 8 and 9.

In the illustrated embodiment of the invention, gate 18 includes a slow acting transistor 56 and a fast acting transistor 57 which are series connected in an output circuit.

The slow acting transistor 56 in channel 12 is connected as a gate amplifier with an input base 58 connected to the collector 53 of transistor 49 of the bistable circuit 17. The transistor 56 includes an emitter 59 which is connected to the output of the driver amplifying transistor 46 by the fast acting transistor 57.

The fast acting transistor 57 is common emitter connected and includes a collector 60 connected to the emitter 59 of transistor 56 and a base 61 connected via capacitor 48 to the driver amplifying transistor 46 in channel 12.

A pulse in channel 12 is therefore simultaneously applied to the bistable circuit 17 and to the gate 18. In the absence of a signal from the bistable circuit 17 at the base 58 of the slow acting transistor 56, the gate 18 is closed. Bistable circuit 17 requires a predetermined operating period between the receipt of an incoming signal and establishing of the output signal. A pulse applied to the fast acting transistor 57 disappears within the operating period of the bistable circuit 17. Therefore, the first pulse in channel 12 which is fed to the bistable circuit 17 to open gate 18 of channel 12 is not passed by the gate 18 because of the timing and delay action of the bistable circuit 17 and slow gate transistor 56. However, if the next pulse to circuit 17 is also from channel 12, the now open gate 18 in channel 12 passes the pulse to the generator 9. The transistor 56 is biased to conduct by the stable condition of the bistable circuit 17 and the fast acting transistor 57 establishes an output signal which is immediately transmitted by the transistor 56 to the generator 9.

Channel 13 functions in a similar manner to transmit a beat pulse whenever two or more pulses are received within each pair of successive pulses in channel 12.

If pulses are applied to the bistable circuit 17 of FIG. 2 alternately from channels 12 and 13, the multivibrator reverts back and forth between the two stable conditions maintaining gates 18 closed for all of the pulse signals in the corresponding channel. Error signals are not transmitted to the generators 8 and 9 and a balance condition is indicated.

The illustrated embodiment of the present invention establishes an output or beat pulse from gate 18 in accordance with the difference in the pulse repetition rate or frequency between the two input signals from the generator 5 and the oscillator 7. The comparator 6 develops the beat frequency pulse each time two or more pulses in one channel are received at the bistable circuit 17 prior to receipt of a pulse at the bistable circuit 17 from the opposite channel. The output is thus obtained by counting only the difference in pulses received from the two trains of pulses in a given period.

Thus, assume the preset frequency of the signal from oscillator 7 is 100 cycles or pulses per second and the frequency of the signal of generator 5 is 102 cycles or pulses per second. There are, therefore, an additional 2 cycles or pulses per second transmitted via channel 12. An error pulse is consequently established every half second from channel 12 to generator 9 and to the rate responsive control 11.

Generator 9 establishes a proportionate correction signal which is fed back to the servo control center 10.

Referring particularly to FIG. 3, a schematic circuit of the rate responsive control 11 shown in FIG. 1 is illustrated. The input circuit 22 includes a pair of resistors 62 and 63 connected respectively to the gates 18 of channels 12 and 13. The opposite ends of the resistors 62 and 63 are connected in common as the input to the filter 23.

The illustrated filter 23 is a direct current filter including a pair of series connected inductors 64 and a plurality of parallel capacitors 65 interconnected in a known ladder network. The action of the inductors 64 and capacitors 65 establishes a positive direct current D.C. voltage across a resistor 66 which is connected across the output of the filter 23. The level of the voltage across the resistor 66 is directly proportional to the pulse repetition rate of the input to either resistor 62 or resistor 63 of the input circuit 22.

The resistor 66 is connected as the input of the correction rate modifier 24. The illustrated correction rate modifier includes a capacitor 67 connected in parallel with a potentiometer 68. One side of the common connected capacitor 67 and potentiometer 68 is connected to the one side of resistor 66. Potentiometer 68 includes a sliding tap 69 interconnected in any suitable manner, not shown, to the control 25 to allow adjustment of the time constant of the parallel elements.

A capacitor 70 is connected in a series circuit with a potentiometer 71 on the output side of the parallel capacitor 67 and potentiometer 68. Potentiometer 71 includes a tap 72 which is interconnected in any suitable manner, not shown, to the control 26 to allow further adjustment of the network time constant. A change in the D.C. voltage at the output of filter 23 does not result in a simultaneous corresponding change across the series connected capacitor 70 and potentiometer 71 because of the action of the capacitors 67 and 70. Further, a proportionate portion of the voltage change appears across the potentiometer 68. A modified D.C. voltage is thereby established across the series circuit which is proportional to the input D.C. voltage with an added component proportional to the rate of change of the input D.C. voltage in accordance with the setting of taps 69 and 72.

A D.C. inverter amplifier 73 is connected to the modified D.C. voltage and increases the level of the signal to a suitable operating level for actuation of the diodes 20. In the illustrated embodiment of the invention, the incoming pulses from gates 18 are positive and the inverter amplifier 73 is employed to produce a negative signal. The illustrated amplifier 73 is shown as a transistor 74 connected to a suitable power supply, not shown, by suitable bias elements. The transistor 74 includes a collector 75 providing the negative signal which is impressed as the control or limiting voltage of the diodes 20.

The output voltage of the amplifier 73 is inversely proportional to the input voltage. Thus, an increasing D.C. voltage to the amplifier 73 establishes an increasingly negative modified voltage at the collector 75. Similarly, a decreasing positive voltage to the amplifier 73 establishes a decreasing negative voltage at the collector 75.

For example, assume that the error in the output of the flow meter 2 increases and consequently a higher pulse repetition rate of the comparator 6 is established. Consequently, the rate at which the pulses are fed to the input circuit 22 increases and the direct current voltage output of the filter 23 increases. The increased voltage is modified by the time constant established by potentiometers 68 and 71 and the modified voltage is applied to the amplifier 73. The amplifier 73 inverts the signal and produces an increasingly negative voltage which is fed from the amplifier 73 to the diode 20. The more negative voltage on the diode 20 results in a smaller clipping of the sawtooth signal from the generator 19 and therefore an increased width of the signal established by the differentiating circuit 21.

Simultaneously with this action, the increased number of pulses from the corresponding channel of the comparator 6 are fed to the diode 20 and increases the number of control pulses from circuit 21.

Therefore, an increasing number of pulses each of an increased width are fed to the control center 10. The number of pulses continues to increase until the error in the flow begins to reduce. Similarly, the width of the control signal continues to increase in accordance with the proportion of error and the rate of change of the error as represented by the increasingly negative output voltage from the amplifier 73 until flow error begins to reduce. The circuit thus results in a very effective and rapid correction of the error producing a selected closed loop stability in accordance with the setting of potentiometers 68 and 71.

The energization of motor 3 is varied accordingly to regulate the opening of the valve 2 and reduce the flow.

The output of generator 5 changes in accordance with the reduced flow and establishes a new frequency output signal which is again compared to the signal from oscillator 7. The relative frequency of the pulses generated by generator 5 and oscillator 7 is continuously compared to regulate the opening of valve 2 and maintain a regulated flow in line 1.

Similarly, if the frequency of the pulse signal from generator 5 is less than the signal from oscillator 7, an error signal is established via channel 13. The error signal is fed from channel 13 to generator 8 and the rate responsive control 11 which establishes a correction signal. The motor 3 is energized to increase the valve opening and consequently the flow and the frequency of the signal from generator 5.

As the pulses transmitted via channels 12 and 13 from the generator 5 and the oscillator 7 to circuit 17 are more nearly in phase, the multivibrator circuit 17 cannot resolve the small time difference between the pulses because of the time required to establish the alternate conditions. The anti-coincident switching circuit 16 blanks the signals from the gate 15 when the time difference is less than the minimum time required for the cricuit 17 to change from one stable state to the other and prevents malfunctioning of the system.

Referring to FIG. 2 in the drawings, and assuming that a pulse signal is being transmitted via channel 12 to the monostable multivibrator forming the anti-coincident switching circuit 16 in channel 12, the illustrated circuit functions as follows.

The pulse signal to circuit 16 in channel 12 establishes a blanking signal which is connected to the transistor 42 forming the gate 15 in the opposite channel 13. The blanking signal effectively closes the gate 15 in channel 13 for the semistable period of the multivibrator and prevents transmission of a signal via channel 13. If a pulse is generated in channel 13 within this time period, it will not be transmitted.

The delay line 31 in channel 13 further has prevented a pulse established by generator 5 immediately prior to the pulse in channel 12 from being transmitted to gate 15 for a selected period. The blanking pulse therefore also prevents transmission of this pulse to circuit 17. Thus, the delay time permits a certain period to pass during which the circuit 16 in channel 12 may be effective to blank or close the gate 15.

In summary, the blanking signal of circuit 16 in channel 12 is effective to blank a pulse in channel 13 which was established either immediately before or shortly after the establishment of the pulse in channel 12. As previously described, the time delay period on line 31 and the timing action of the multivibrator forming circuit 16 is selected to prevent transmission of substantially inphase pulses or pulses at a rate faster than the working action or operating time of the illustrated bistable circuit 17.

The action of the illustrated embodiment of the invention is generally only limited by the operating period or time of the circuit 17. By employing very rapid acting transistors and diodes, the circuit will discriminate between very high frequency signals and provide a high degree of accuracy and sensitivity.

The present invention thus provides a comparator for directly comparing the frequencies of a pair of signals in a closed loop control system or in any other desired application.

Various modes of carrying out the invention are contemplated as being within the scope of the following claims particularly pointing out and distinctly claiming the subject matter which is regarded as the invention.

We claim:

1. In a frequency comparator having a pair of output channels establishing a positive polarity output pulse in the channel associated with the higher frequency signal and a pair of square wave signal formers connected one to each of said output channels, said formers including a sawtooth generator feeding a diode having an element determining the width of the square wave signal, the combination with said formers of a rate modifier comprising a pair of resistors having one end of each connected to different output channels and the opposite ends connected in common, a direct current filter connected to said resistors and establishing a direct current voltage in proportion to the pulse repetition rate of the output pulses, a modifying circuit including a capacitor and a potentiometer connected in a series circuit across the output side of the filter and a capacitor and a potentiometer in parallel between one side of the filter and the series circuit, said potentiometers constituting means for adjusting the network time constant, and an inverter amplifier connected to the output of the modifying circuit and connected to said diodes for automatically adjusting the width of each square wave signal in accordance with the frequency of said output pulses.

2. In a closed loop control, an electroresponsive function control, a function sensing means, a reference signal means, a first channel having an input gate connected by a time delay line to said reference signal means to receive a train of reference pulses and having an output gate, a second channel having an input gate connected to said function sensing means to receive a train of control pulses and having an output gate, each of said channels including a monostable multivibrator circuit with an input connected to said sensing means and to reference signal means and an output connected to the input gate in the opposite channel, a non-saturating bistable multivibrator circuit connected to the output of said input gates and biased to one state by a pulse in the first channel for establishing a first output connected to open the first channel output gate and close the second channel output gate and biased to a second state by a pulse in the second channel for establishing an output connected to open the second channel output gate and close the first channel output gate, said non-saturating bistable multivibrator circuit having a maximum operating period, said time delay lines and said monostable multivibrator circuits functioning to prevent transmission of alternate channel pulses at a rate exceeding the operating time of the bistable multivibrator, a pair of square wave forming circuits having connected one each to said output gates and having limiting diodes determining the width of the square wave pulse established for each input pulse, each diode having a control element, a pair of resistors connected to said output gates in parallel, a D.C. filter connected to the opposite side of the pair of resistors, a modifying circuit including a capacitor and a potentiometer connected in a series circuit across the output side of the filter and a capacitor and a potentiometer in parallel between one side of the filter and the series circuit, said potentiometers constituting means for adjusting the network time constant, an inverter amplifier connected to the output of the modifying circuit and connected to the control elements of said diodes for automatically adjusting the width of each square wave signal in accordance with the frequency of said output pulses, and means connecting the output of said square wave forming circuits to said electroresponsive function control to establish and maintain the function in accordance with the setting of the reference signal means.

3. A frequency responsive control, comprising a first signal channel for receiving a train of reference pulses, a second signal channel for receiving a train of control pulses, output means connected to said channels and automatically comparing the reference pulses and control pulses and establishing an output beat pulse each time at least two pulses are received from one channel prior to receipt of a pulse from the opposite channel, a frequency sensitive means including a filter having an input connected to said output means and establishing a D.C. voltage signal proportional to the number of beat pulses per given time and a modifying circuit including a paralleled potentiometer and a capacitor in parallel circuit with the output of the filter and a second paralleled potentiometer and capacitor in series circuit between said filter and said first-named paralleled potentiometer and capacitor, said modifying circuit establishing an output in accordance with the amplitude of the D.C. signal from the filter and with the rate of change thereof.

References Cited by the Examiner

UNITED STATES PATENTS

| | | | |
|---|---|---|---|
| 2,420,374 | 5/47 | Houghton | 332—15 |
| 2,636,133 | 4/53 | Hussey | 307—88.5 |
| 2,795,695 | 6/57 | Raynsford | 328—133 |
| 2,809,339 | 10/57 | Guggi | 307—88.5 |
| 2,941,096 | 6/60 | Gunkel | 307—88.5 |
| 2,963,648 | 12/60 | Baskin et al. | 331—27 |
| 3,005,165 | 10/61 | Lenigan | 331—27 |
| 3,018,387 | 1/62 | Beck | 307—88.5 |

ARTHUR GAUSS, *Primary Examiner.*

GEORGE N. WESTBY, *Examiner.*